United States Patent [19]

Roy et al.

[11] Patent Number: 4,644,405
[45] Date of Patent: Feb. 17, 1987

[54] METHOD AND APPARATUS FOR SCANNING A WINDOW IN THE IMAGE ZONE OF A CHARGE TRANSFER DEVICE OF THE FRAME TRANSFER TYPE

[75] Inventors: Jean-Claude Roy, Fresnes; Patrick Seugnet, Sceaux, both of France

[73] Assignee: Societe de Fabrication d'Instruments de Mesure, Massy, France

[21] Appl. No.: 743,077

[22] Filed: Jun. 10, 1985

[30] Foreign Application Priority Data

Jun. 15, 1984 [FR] France ............................. 84 09390

[51] Int. Cl.[4] .......................... H04N 3/14; H04N 7/00
[52] U.S. Cl. ..................................... 358/213; 358/180
[58] Field of Search ................ 358/213, 212, 227, 180

[56] References Cited

U.S. PATENT DOCUMENTS

| | | | |
|---|---|---|---|
| 4,002,824 | 1/1977 | Petrocelli et al. | 358/213 |
| 4,032,976 | 6/1977 | Levine | 358/213 |
| 4,178,614 | 12/1979 | Sauer | 358/213 |
| 4,188,642 | 2/1980 | Morishita et al. | 358/213 |

Primary Examiner—Gene Z. Rubinson
Assistant Examiner—Stephen Brinich

[57] ABSTRACT

In order to scan a relatively small window (F) in the image zone (ZI) of a charge transfer device, a series of prior transfers ($B_1$, $B_2$, $B_3$) are performed moving from the image zone to the memory zone (ZM) to move the leading edge of the window until it is adjacent to the output shift register (RD). The lines of the window may then be read conventionally ($B_4$) omitting any reading of the lines that come before or after. This considerably reduces the delay (between steps $B_1$ and $B_4$) between image acquisition and signal processing, without altering the frame frequency which remains fixed at 50 Hz, for example.

12 Claims, 3 Drawing Figures

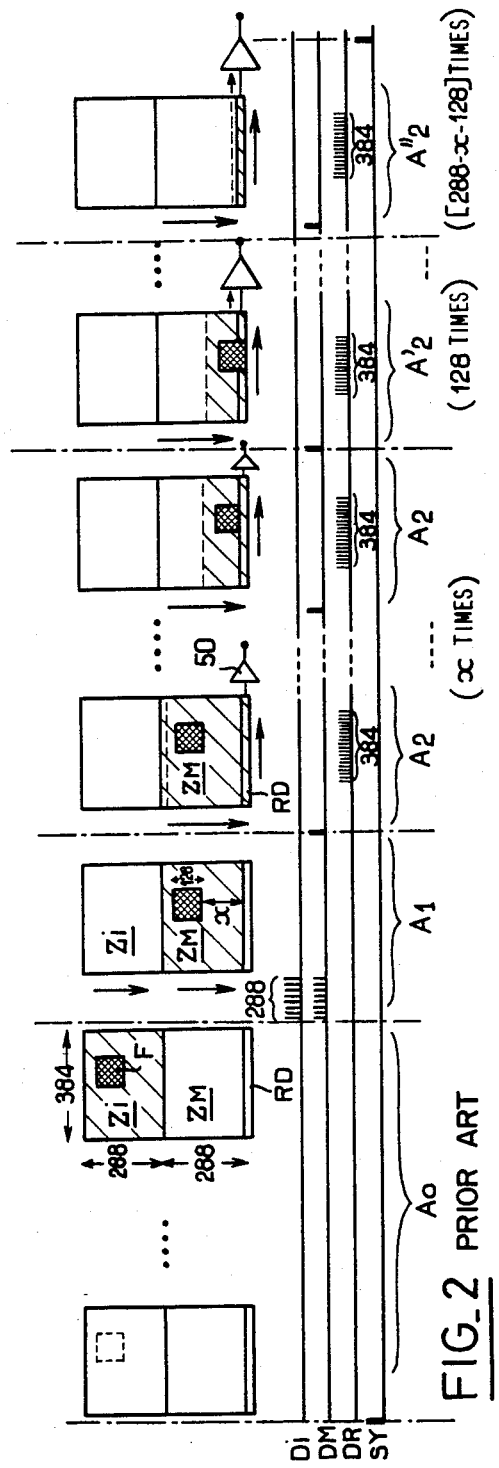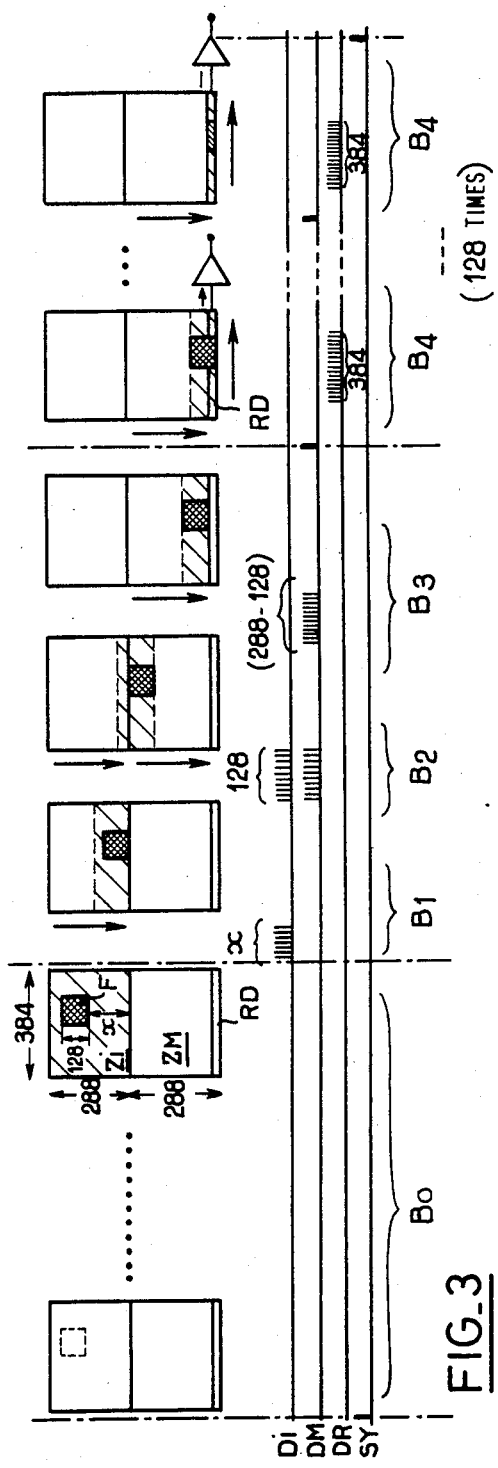
FIG_2 PRIOR ART
FIG_3

METHOD AND APPARATUS FOR SCANNING A WINDOW IN THE IMAGE ZONE OF A CHARGE TRANSFER DEVICE OF THE FRAME TRANSFER TYPE

The present invention relates to a method and to apparatus for scanning a window in the image zone of a charge transfer device of the frame transfer type.

BACKGROUND OF THE INVENTION

Conventionally, charge transfer devices of this type comprise:
- an image zone disposed in the focal plane of optical image-producing means, and constituted by a matrix of m lines of n photosensitive sites;
- an adjacent, blind, memory zone constituted by a matrix of m lines of n memory positions; and
- an n position shift register.

To perform frame transfers, scanning circuits are provided comprising:
- first shifting means for transferring charges line-by-line and in parallel along each column of the image zone towards the memory zone;
- second shifting means for transferring charges line-by-line in parallel along each column of the memory zone towards the shift register; and
- third shifting means for reading the shift register serially at a given sampling frequency in order to reconstitute an output video signal.

Conventionally, an image zone is scanned line-by-line in the manner described below with reference to FIG. 2 which shows this prior art mode of operation (and takes, by way of example, a matrix of $m \times n = 288 \times 384$ pixels corresponding to devices which are currently commercially available, even though any other matrix size could naturally be envisaged).

To begin with, an initialization and integration phase ($A_O$) serves to form an image (integration) on the image zone ZI of the charge transfer device, optionally after the device has been "cleared" (initialization) by deliberately zeroing all cells in order to avoid remanence effects.

Then (phase $A_1$) the entire image zone ZI is copied into the memory zone by simultaneous action of the above-mentioned first and second shifting means; this corresponds to sending a burst of 288 pules to inputs DI and DM of the respective shifting means.

Finally (phases $A_2$, $A'_2$ and $A''_2$), the memory zone is shifted by one line (a single pulse to the input DM) and the shift register RD is read (a burst of 384 pulses on the input DR) to the third shifting means), thereby providing an output video signal corresponding to said line. This is repeated for the following line, and so on, until the memory zone is empty. One entire frame can then be transferred line-by-line and the preceding steps may be repeated (initialization, integration, transfer, line-by-line reading) for the following frame. This may be provoked by sending a frame synchronizing pulse SY.

The synchronizing pulse recurrence frequency SY and the scan duration of each line are preferably chosen to have values corresponding to European video standards, namely a frame duration of 20 ms (50 Hz) and a line duration of 64 $\mu$s. It can thus be seen that the duration of steps $A_2 \ldots A''_2$ is not less than $288 \times 0.064 = 18.432$ ms. If the clock frequency for the first and second shifting means is selected to be equal to 1 MHz, giving a shifting period of 1 $\mu$s for each line in the image and memory zones, the duration of the phase $A_1$ is not less than $288 \times 0.001 = 0.288$ ms.

Overall, the duration of steps $A_1 \ldots A''_2$ is not less than 18.72 ms. In other words, between the end of the integration step (signal acquisition step) and the end of transferring the last line of the frame into a working memory (the moment where the signal becomes usable by a computer), a delay of not less than 18.72 ms is created, i.e. of the same order of magnitude as the sampling period (20 ms).

In some applications, such a delay between signal acquisition and signal storage in a working memory is unacceptable.

This is true of firing control systems: remote projectile guidance towards a target requires servo control having very small time constant because of the very high speed of the projectile, and also, in some cases, of the target.

This explains why charge transfer devices have not been used in such applications up until now.

An aim of the invention is to overcome this drawback by considerably reducing the pure delay inherent to the conventional mode of scanning charge transfer devices. In this manner, the invention makes it possible to use charge transfer devices in systems which require very short response times.

Another aim of the invention is to make it possible to lengthen the duration of the prior steps of initialization and integration, in particular to provide a sufficient lapse of time for the initialization phase of zeroing the image and memory zones, etc. The prior art limited these possibilities since the initial step was not only necessarily very short, e.g. $20 - 18.72 = 1.28$ ms in the above-described example, but it was also, for the most part, devoted to the integration phase.

Finally, the possibility of reducing the integration period to as small a value as possible (taking account of the received light intensity) makes it possible to reduce image "smudging", thereby increasing the overall accuracy of the system. This is particularly useful when light spots are subjected to barycenter calculation: if a smudge is recorded rather than a spot, the barycenter is considerably offset for high-speed spots (with such an offset corresponding to an additional acquisition delay).

The method of the invention is applicable whenever it is desirable to scan a window of p lines of q pixels each, i.e. whenever interest is centered on a predetermined zone of the image. The invention is applicable, in particular, to angle measuring or video tracking devices, in which a processing window centered on a previously-designated target has already been defined. The position of the window within the image zone and, optionally, the size thereof are determined by calculation (e.g. by calculating the barycenter). The position and size may vary from one frame to the next as a function of target motion.

However, this application is not limiting, and the invention may be used in numerous other kinds of video image processing whenever the video image is derived from a charge transfer device.

SUMMARY OF THE INVENTION

To this end, the method according to the invention comprises the following steps in succession:
- integrating the light flux striking the photosensitive sites in the image zone;
- prior shifting the image and memory zones by (m+x) lines, where x is the number of lines between the first line of the window and the boundary between the image zone and the memory zone, in such a manner as to cause said first line of the window to be adjacent to the boundary between the memory zone and the shift register; and sequentially scanning the window by repeating the following steps p times at a given line frequency:

actuating the second shifting means in such a manner as to shift the memory zone by one line; and actuating the third shifting means in such a manner as to read the contents of the shift register serially.

Preferably, the prior shifting step comprises the following steps:

activating the first shifting means in such a manner as to shift the image zone by a number of lines equal to the number x of lines between the first line of the window and the boundary between the image zone and the memory zone;

simultaneously actuating the first and the second shifting means in such a manner as to shift both the image zone and the memory zone together through p lines; and activating the second shifting means in such a manner as to shift the memory zone by (m−p) lines.

Thus, in this case, operation the first shifting means is decoupled from operation of the second shifting means (which in the prior art were always operated simultaneously since no operation other than copying the image zone in the memory zone was intended). In this manner, only those lines of the image zone which contain the window to be scanned are transferred to the memory zone. The lines prior to the window and after the window are not copied into the memory zone: although these lines were not used for subsequent processing, not copying them avoids any interference with the useful lines (i.e. the lines in the window) when performing line-by-line transfer from the memory zone to the read shift register.

Additionally, the integration step is preceded by a step of clearing the image and memory zones by activating both the first and second shifting means in such a manner as to shift both the image and the memory zones through m lines.

In this case, and advantageously, the beginning of the clearing step is delayed relative to the end of the step of scanning the window in the preceding frame, by a variable delay which is reduced with a reduction in the average light flux striking the window, thereby matching the duration of the following integration stage to said light intensity.

Charge transfer devices are very sensitive to overexposure phenomena, and they are also subject to dazzling phenomena. This characteristic of the invention serves to reduce the exposure time of the image zone as much as may be required without, thereby, increasing the acquisition delay.

Finally, and advantageously, the third shifting means may be activated at two different operating frequencies during a single shift register read operation. These frequencies comprise a slow frequency corresponding to the q useful pixels in the line, and a fast frequency corresponding to the n−q other pixels.

The fast frequency may be twice the slow frequency, for example.

In this manner, and for a fixed total line-scanning time (64 μs), quicker access is provided to the useful pixels, and above all these useful pixels may be read more slowly, thereby minimizing degradation in the corresponding signal.

The invention also provides a scanning circuit for performing the above-defined method, and comprising, in accordance with the invention, a driver circuit cooperating:

with the first and second above-mentioned shifting means during a first phase to prior shift the image and memory zones through a predetermine number of lines; and with the second and third shifting means during a second phase in such a manner as to sequentially scan a region of the memory zone adjacent to the shift register line-by-line, said region corresponding to a useful window of small size and initially contained within the image zone.

Preferably, the driver circuit also cooperates during a prior clearing phase preceding the integrating step with the first and second shifting means to shift both the image and the memory zones through m lines. In this case, it is advantageously provided with means for adapting the sensitivity of the device and suitable for delaying the beginning of the clearing phase relative to the end of the window-scanning phase by a variable duration which increases with an increase in the average intensity of the light flux striking the window, whereby said light flux is matched to the duration of the following integration step.

BRIEF DESCRIPTION OF THE DRAWINGS

An implementation of the invention is described by way of example with reference to the accompanying drawings, in which:

FIG. 2, as described above, illustrates the prior art technique of scanning the image supplied by the charge transfer device during one frame; and FIG. 3 is analogous to FIG. 2 but shows the method in accordance with the invention.

MORE DETAILED DESCRIPTION

Figure 1:
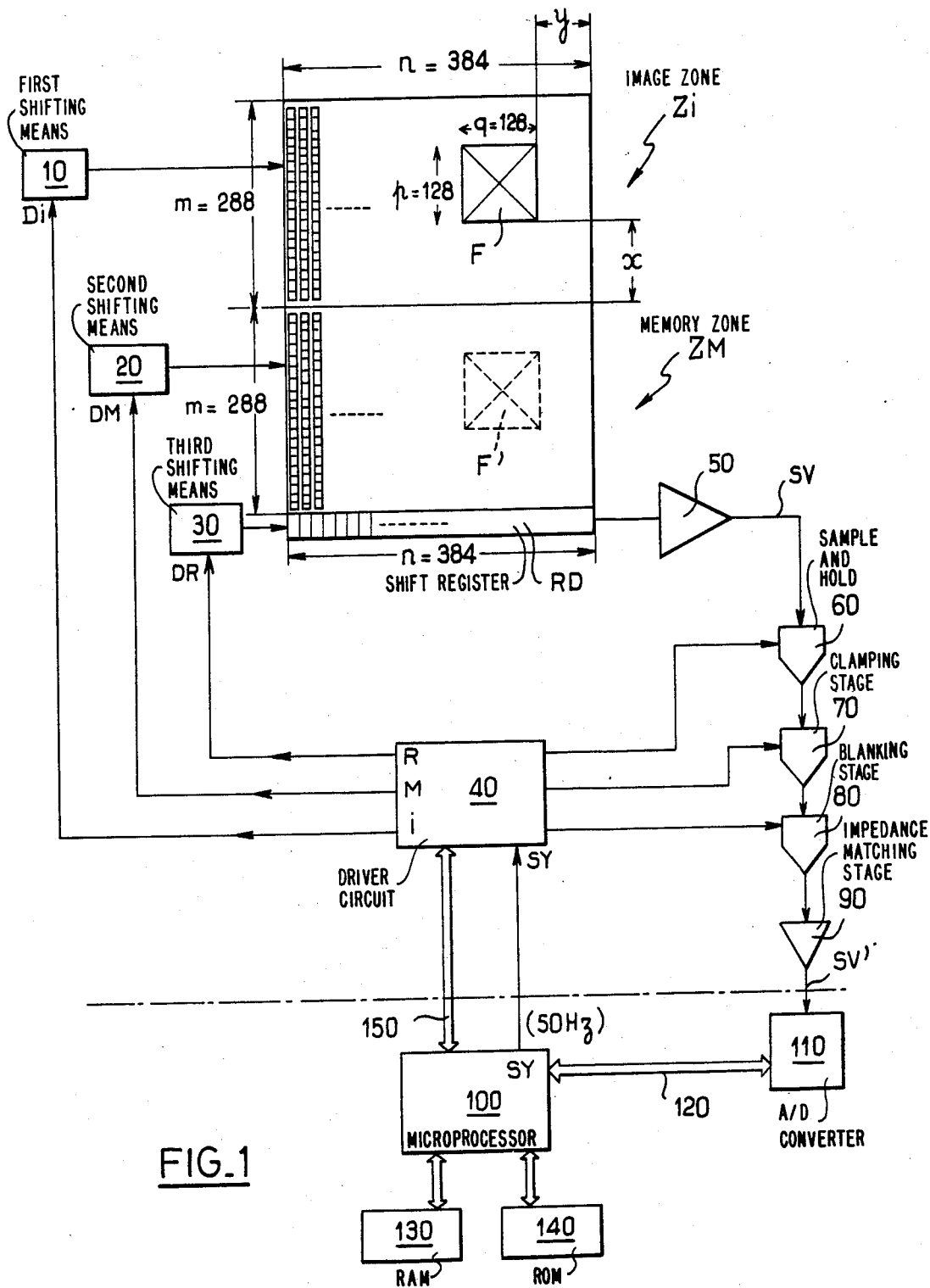
FIG. 1 is a diagrammatic view of a video imaging circuit including a charge transfer device, scanning circuits therefor, and video signal processing circuits.

FIG. 1 shows a charge transfer device of the frame transfer type, the device comprises an image zone ZI, a memory zone ZM, and a shift register RD. The image zone ZI is disposed in the focal plane of an image-forming device, and the memory zone ZM is adjacent thereto and blind. Otherwise the zones are constituted in identical manner. Each zone comprises n=384 columns, with each column itself being constituted by an elementary linear charge transfer device having m=288 positions.

Thus, the image zone comprises a matrix of 288 lines having 384 pixels each, and the memory zone comprises a matrix of 288×384 memory positions which are organized identically.

The shift register RD is constituted by a single elementary charge transfer device having 384 positions.

First shifting means 10 serve to displace the contents of all of the elementary charge transfer devices in the image zone by one position towards the memory zone ZM. In other words, the content of the image zone ZI is shifted downwards (as shown in the figures) by one line. This shift is performed by sending pulses to the input DI of the shifting means 10, with each pulse corresponding to a one-line shift (the shift generally requires 1 μs per line, which corresponds to a pulse recurrence frequency of 1 MHz).

Likewise, the second shifting means 20 serve to shift the contents of the memory zone ZM towards the shift register under the control of pulses applied to an input DM at the same clock frequency as for the first shifting means 10.

Finally, the third shifting means 30 serve to empty the contents of the shift register RD towards an amplifier 50, thereby sequentially reading the line loaded in the shift register. The shift register is read by applying pulses to an import DR at a clock frequency enabling an entire line to be read in 64 μs.

It is thus possible to provide a single operating frequency of 6 MHz (reading 384 pixels in 64 μs), or else to provide two operating frequencies for reading a single line: for example reading the 128 useful pixels at 4 MHz (thereby reducing distortion in the output signal) while reading the other 256 pixels at 8 MHz.

The various shifting means are supplied with driving pulses by a driver circuit 40 whose operating sequence is described below.

At the output from the amplifier 50, the video signal SV is processed by a sample-and-hold stage 60 which smoothes the video signal by eliminating the portions lying between successive pixels. There follows a black-level clamping stage 70 which sets the black-level points from the charge transfer device to zero volts. The next stage 80 is a blanking stage for applying the zero volt black-level during black periods between successive lines. Finally, a stage 90 matches the impedance and the level of the video signal to provide a signal SV' for application to signal-analysis circuits.

The signal analysis circuits comprise a microprocessor 100 connected via a two-way serial link 120 to an analog-to-digital converter 110 which digitizes the video signal SV' in real time. A random access read-/write memory (RAM) 130 and a read only memory (ROM) 140 are associated with the microprocessor 100, and the microprocessor 100 is additionally connected to the driver circuit 40 via a link 150 and also via a line for transmitting a synchronizing signal SY at the reference frame frequency, which is generally 50 Hz. The link 150 serves to exchange data such as: eliminating bad points in the charge transfer device from the corresponding video signal (the locations of the bad points being stored in the RAM 130) by temporarily inhibiting the sample-and-hold circuit 60; modifying the sequence of operations to adjust the sensitivity of the device to the average brightness of the observed scene; determining the coordinates and the size of a processing window F; and exchanging synchronizing pulses, in particular end-of-line synchronizing pulses.

The invention is applicable to a situation in which it is desired to scan a window F of relatively small size within the image zone. The window is p lines by q columns (e.g. 128 lines ×128 columns). It is located somewhere in the image zone such that there are x lines between the window and the boundary between the image zone and the memory zone, and y columns between the window and that edge of the image zone which corresponds to the beginnings of the lines. The reference F' designates the position in the memory zone which corresponds to the window F.

A first way of scanning the window is to employ the prior art technique as illustrated in FIG. 2: after initialization, the photosensitive sites of the image zone are excited during an integration phase so as to transform light into an electric charge. At the end of the integration phase, the image zone is copied into the memory zone (phase $A_1$) by simultaneously actuating the first and second shifting means, i.e. by sending a burst of 288 pulses to each of the inputs DI and DM (in order to shift each zone downwards by a distance of 288 lines).

The image transferred in this manner to the memory zone is then scanned line-by-line: the scanning of each line comprises (phase $A_2$) sending one pulse to the input DM to shift the memory zone down by one line and thereby load the shift register with the adjacent line from the memory zone; followed by applying a burst of 384 pulses to the input DR to empty the shift register into the video signal amplifier 50.

One line is thus scanned. To scan the window, it is necessary to begin by reading the x lines which lie between the bottom of the window and the bottom of the memory zone (phase $A_2$ needs repeating x times).

The lines of the window are then scanned in the same manner (phase $A'_2$ is repeated 128 times).

After scanning the useful lines (i.e. the lines in the window) the memory zone must then be emptied before the cycle can begin again; this is done by performing phase $A''_2$ (288−128) −x times.

The following frame may then be begun (by sending a frame synchronizing pulse to input SY).

The time occupied by each of these phases is as follows:

phase $A_1$: 288 pulses at 1 μs, i.e. 0.288 ms;
each of phases $A_2$, $A'_2$ or $A''_2$: 64 μs.

The total duration of phases $A_1$, $A_2$, ... $A''_2$ is not less than 18.72 ms which corresponds to scanning the entire image zone; this time is pure delay and the invention seeks to reduce this delay.

Since the frame duration is constant (20 ms) there remains a maximum of 1.28 ms for initialization and integration (phase $A_0$).

FIG. 3 illustrates the way the window F is scanned in accordance with the invention. After initialization and integration (phase $B_0$), a burst of x pulses is applied to the input DI (where the value of x is known by the microprocessor circuit 100 and transmitted to the driver circuit over the bus link 150), in order to move the window F in the image one down to the boundary between the image zone and the memory zone.

A burst of p=128 pulses (phase $B_2$) is then applied simultaneously to both the first and the second shifting means, thereby copying the window into the memory zone such that its last line is adjacent to the boundary between these two zones.

Then (phase $B_3$), a burst of (288−128) pulses is applied to the input DM of the second shifting means thereby bringing the first line of the window down through the memory zone until it is adjacent to the boundary between the memory zone and the shift register.

The 128 lines of the window are then read sequentially by executing 128 phases $B_4$ each of which is identical to the above-described phase $A'_2$.

The time occupied by these various phases is as follows:

phases $B_1$ and $B_3$=(288+x) pulses at 1 μs, i.e. somewhere in the range 0.288 ms to 0.448 ms; and
the set of phases $B_4$=128×0.064 ms, i.e. 8.192 ms.

Under these conditions, the minimum total duration of phases $B_1$, $B_2$ ... $B_4$ lies between 8.48 and 8.64 ms. It can be seen that the pure delay in acquisition has been reduced to less than half of the prior value.

There now remains between 11.52 and 11.36 ms for the initialization and integration phase $B_0$.

This time lapse may profitably be used for performing additional "clearing" scans of the image zone, thereby avoiding the remanence phenomena which are well known in charge transfer devices.

In order to do this, the image and memory zones are completely cleared at the beginning of each frame by fully transferring the image and memory zones, but without reading the shift register. This transfer constitutes rapid evacuation of the charges accumulated in these two zones.

In order to avoid any risk of being dazzled, the sensitivity of the device is automatically adjusted to reduce the duration of the integration phase if the brightness of the observed scene is excessive.

In order to adjust the sensitivity of the device, the clearing transfer takes place at a variable moment in time, i.e. the clearing transfer does not necessarily take place at the beginning of a frame (with frame beginnings being marked by the synchronization signal SY), and the clearing moment may be delayed as long as is necessary to reduce the integration time and thus the sensitivity of the device.

Such adjustment of the position in time of the clearing transfer is determined by the driver means 40 under the control of the microprocessor circuit 100 which analyzes the image.

It may be observed that the frame frequency which corresponds to the refresh frequency of the information processed by the microprocessor 100 remains unchanged in spite of variations in the integration period, and data is thus always periodically refreshed at 20 ms intervals in the example described, thereby leaving the microprocessor with the same amount of time to process this data on each occasion.

We claim:

1. A method of scanning a window of p lines of q pixels in a charge transfer device of the frame transfer type, the charge transfer device comprising;
    an image zone disposed in the focal plane of optical image-producing means, and constituted by a matrix of m lines of n photosensitive sites;
    an adjacent, blind, memory zone constituted by a matrix of m lines of n memory positions; and
    an n position shift register;
    scanning circuits, said scanning circuits comprising comprising:
    first shifting means for transferring charges lineby-line and in parallel along each column of the image zone towards the memory zone;
    second shifting means for transferring charges lineby-line in parallel along each column of the memory zone towards the shift register; and
    third shifting means for reading the shift register serially at a given sampling frequency in order to reconstitute an output video signal,
    the method including the improvement whereby it comprises the following successive steps:
    integrating a light flux striking the photosensitive sites in the image zone;
    shifting the image and memory zones by (m+x) lines, where x is the number of lines between the first line of the window and a boundary between the image zone and the memory zone, in such a manner as to cause said first line of the window to be adjacent to the boundary between the memory zone and the shift register, prior to commencement of scanning;
    sequentially scanning the window by repeating the following steps p times at a given line frequency;
    actuating the second shifting means in such a manner as to shift the memory zone by one line; and
    actuating the third shifting means in such a manner as to read the contents of the shift register serially.

2. A method according to claim 1, wherein the prior shifting step comprises the following steps:
    activating the first shifting means in such a manner as to shift the image zone by a number of lines equal to the number x of lines between the first line of the window and the boundary between the image zone and the memory zone;
    simultaneously actuating the first and the second shifting means in such a manner as to shift both the image zone and the memory zone together through p lines; and
    activating the second shifting means in such a manner as to shift the memory zone by (m−p) lines.

3. A method according to claim 1, wherein the integrating step is preceded by an image zone and memory zone clearing step, performed by activating the first and second shifting means in such a manner as to shift each of said zones through m lines.

4. A method according to claim 3, wherein a delay is provided between the beginning of the clearing step and the end of scanning the window in the previous frame, said delay being variable and increasing with increasing average light flux striking the window, thereby adjusting the duration of the following integrating step to said light intensity.

5. A method according to claim 1, wherein the third shifting means is capable of being activated at two operating frequencies, i.e. slow frequency corresponding to the q useful pixels of the line, and a fast frequency corresponding to the n−q other pixels.

6. A method according to claim 5, wherein the fast frequency is twice the slow frequency.

7. A scanner circuit charge transfer device combination for scanning a window of p lines of q pixels in a charge transfer device of the frame transfer type, said charge transfer device comprising:
    an image zone disposed in the focal plane of optical image-producing means, and constituted by a matrix of m lines of n photosensitive sites, suitable for evaluating the intensity of a light flux striking them during an integration step;
    an adjacent, blind, memory zone constituted by a matrix of m lines of n memory positions; and
    an n position shift register; said scanner circuit comprising:
    first shifting means for transferring charges line-by-line and in parallel along each column of the image zone towards the memory zone;
    second shifting means for transferring charges line-by-line in parallel along each column of the memory zone towards the shift register; and
    third shifting means for reading the shift register serially at a given sampling frequency in order to reconstitute an output video signal; said scanner circuit including the improvement whereby it further includes a driver circuit co-operating:
    with the first and second shifting means, during a first phase for shifting the image and memory zones through a predetermined number of lines prior to commencement of scanning; and
    with the second and third shifting means during a second phase in such a manner as to sequentially scan a region of the memory zone adjacent to the shift register line-by-line, said region corresponding to a useful window of small size and initially contained within the image zone.

8. A scanner circuit charge transfer device combination according to claim 7, wherein said third shifting means are capable of being activated, during a single shift register read at two operating frequencies, i.e. slow frequency corresponding to the q pixels of the line which are within said window, and a fast frequency corresponding to the n−q other pixels.

9. A scanner circuit charge transfer device combination according to claim 7, wherein the driver circuit also cooperates during a prior clearing step before the integration step with the first and second shifting means to shift each of the image and memory zones through m lines.

10. A scanner circuit according to claim 9, wherein said third shifting means are capable of being activated, during a single shift register read at two operating frequencies, i.e. slow frequency corresponding to the q pixels of the line which are within said window, and a fast frequency corresponding to the n−q other pixels.

11. A scanner circuit charge transfer device combination according to claim 9, further provided with means for adapting the sensitivity of the device to the received light flux, said means being suitable for delaying the beginning of the clearing step relative to the end of scanning the window in the previous frame by a variable length of time, said length of time increasing with increasing average light flux striking the window, thereby varying the duration of the integration period to match the received light flux.

12. A scanner circuit according to claim 11, wherein said third shifting means are capable of being activated, during a single shift register read at two operating frequencies, i.e. slow frequency corresponding to the q pixels of the line which are within said window, and a fast frequency corresponding to the n−q other pixels.

* * * * *